United States Patent
Padilla Haro (10) Patent No.: US 10,053,014 B2
(45) Date of Patent: Aug. 21, 2018

(54) VIRTUAL TAG DISPLAY SYSTEM

(71) Applicant: Ford Global Technologies, LLC, Dearborn, MI (US)

(72) Inventor: Rene Javier Padilla Haro, La Magdalena Contreras (MX)

(73) Assignee: Ford Global Technologies, LLC, Dearborn, MI (US)

( * ) Notice: Subject to any disclaimer, the term of this patent is extended or adjusted under 35 U.S.C. 154(b) by 261 days.

(21) Appl. No.: 14/869,095

(22) Filed: Sep. 29, 2015

(65) Prior Publication Data
US 2017/0088056 A1    Mar. 30, 2017

(51) Int. Cl.
| | |
|---|---|
| *B60L 1/00* | (2006.01) |
| *B60R 1/12* | (2006.01) |
| *B60R 11/02* | (2006.01) |
| *B60R 16/033* | (2006.01) |
| *H02J 7/35* | (2006.01) |
| *G07C 1/30* | (2006.01) |

(52) U.S. Cl.
CPC ............ *B60R 1/12* (2013.01); *B60R 11/0229* (2013.01); *B60R 16/033* (2013.01); *G07C 1/30* (2013.01); *H02J 7/35* (2013.01); *B60R 2001/1215* (2013.01)

(58) Field of Classification Search
USPC .......................................................... 307/9.1
See application file for complete search history.

(56) References Cited

U.S. PATENT DOCUMENTS

| | | |
|---|---|---|
| 9,064,358 B2 | 6/2015 | Lidror |
| 2009/0134984 A1 | 5/2009 | Chen |
| 2011/0131154 A1 | 6/2011 | Faber et al. |
| 2011/0210827 A1 | 9/2011 | Lidror |
| 2014/0043156 A1 | 2/2014 | Howk, Jr. |
| 2014/0249713 A1 | 9/2014 | Davis |
| 2014/0379475 A1 | 12/2014 | Sarangi |
| 2015/0032328 A1 | 1/2015 | Healey et al. |

FOREIGN PATENT DOCUMENTS

| | | |
|---|---|---|
| DE | 19725209 A1 | 12/1998 |
| DE | 202005019957 U1 | 4/2006 |
| DE | 102014011017 A1 | 1/2016 |

OTHER PUBLICATIONS

Search Report dated Feb. 16, 2017 for U.K.. Patent Application No. GB 1616476.6.

*Primary Examiner* — Rexford Barnie
*Assistant Examiner* — Dru Parries
(74) *Attorney, Agent, or Firm* — James P. Muraff; Neal, Gerber & Eisenberg LLP (57) ABSTRACT

Various embodiments of the present disclosure provide a virtual tag display system. Generally, the virtual tag display system is configured to display one or more virtual tags stored in a memory of the vehicle such that the virtual tag(s) are viewable from outside the vehicle.

18 Claims, 8 Drawing Sheets

VIRTUAL TAG DISPLAY SYSTEM

TECHNICAL FIELD

The present disclosure generally relates to a virtual tag display system. More particularly, the virtual tag display system is configured to display one or more virtual tags stored in a memory of the vehicle such that the displayed virtual tag(s) are viewable from outside the vehicle.

BACKGROUND

A typical vehicle owner attaches a number of different physical tags to her vehicle so others can view information printed on those physical tags from outside the vehicle. The information usually indicates that the vehicle owner has permission to take certain actions or access certain areas. For example, a vehicle owner may hang a handicapped parking permit (a form of physical tag) from the vehicle's interior rearview mirror to indicate that she has permission to park the vehicle in a handicapped parking spot. In another example, a vehicle owner may affix a parking permit to the vehicle's rear window to indicate that he has permission to park the vehicle in a certain parking area, such as a business's private parking lot. In another example, a vehicle owner may affix a vehicle registration sticker to the vehicle's windshield to indicate the city in which the vehicle is registered and that the vehicle's registration is up-to-date.

These physical tags have some drawbacks. One drawback is that certain laws or regulations require certain physical tags, such as handicapped parking permit hang tags, to be hung from the interior rearview mirror when the vehicle is parked but stored elsewhere while the vehicle is traveling. This requires the vehicle owner to constantly hang and remove the physical tag, which is bothersome and increases the chances that the vehicle owner will lose or damage the physical tag. Another drawback is that if a vehicle owner owns multiple vehicles, the vehicle owner has to ensure that the vehicle the vehicle owner is driving on a particular day has the appropriate physical tags. For instance, if a vehicle owner owns four vehicles, he has to ensure that his employee lot parking permit is in whichever vehicle he drives to work each day. This either requires the vehicle owner to obtain multiple copies of the same physical tag (one for each vehicle) or to ensure that whenever he drives a vehicle it has the necessary physical tags.

There is a need for new systems that solve these problems.

SUMMARY

The appended claims define this application. The specification summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Exemplary embodiments provide a virtual tag display system configured to display one or more virtual tags stored in a memory of the vehicle such that the displayed virtual tag(s) are viewable from outside the vehicle.

According to one embodiment, the vehicle tag display system comprises a housing, a display device supported by the housing and configured to display a virtual tag in response to data received from a vehicle computing system, a power transmission device electrically connectable to a vehicle power source to power the display device, and a data transmission device electrically connectable to the vehicle computing system to enable data transfer from the vehicle computing system to the display device.

According to another embodiment, a mirror assembly comprises a base including a display device configured to display a virtual tag in response to data received from a vehicle computing system, a power transmission device electrically connectable to a vehicle power source to power the display device, a data transmission device electrically connectable to the vehicle computing system to enable data transfer from the vehicle computing system to the display device, and a mirror connected to the base.

According to another embodiment, a vehicle comprises a vehicle computing system, a display device separate from and electrically connected to the vehicle computing system to enable data transfer from the vehicle computing system to the display device, the display device configured to display a virtual tag in response to data received from the vehicle computing system, and a vehicle power source electrically connected to the display device to power the display device.

BRIEF DESCRIPTION OF THE DRAWINGS

For a better understanding of the invention, the detailed description references embodiments shown in the following drawings. The components in the drawings are not necessarily to scale and related elements may be omitted to emphasize and clearly illustrate the novel features described herein. In addition, system components can be variously arranged, as known in the art. In the drawings, like referenced numerals may refer to like parts throughout the different drawings unless otherwise specified.

FIGS. 2A and 2B illustrate the virtual tag display system of.

FIG. 1A attached to a windshield of a vehicle.

DETAILED DESCRIPTION OF EXAMPLE EMBODIMENTS

Virtual Tag Display System

While the virtual tag display system of the present disclosure may be embodied in various forms, the drawings show and this specification describes some exemplary and non-limiting embodiments of the virtual tag display system. The present disclosure is an exemplification of the virtual tag display system and does not limit the virtual tag display system to the specific illustrated and described embodiments. Not all of the depicted or described components may be required, and some embodiments may include additional, different, or fewer components. The arrangement and type of components may vary without departing from the spirit or scope of the claims set forth herein.

1. Virtual Tag Display System Components

Figure 1A:
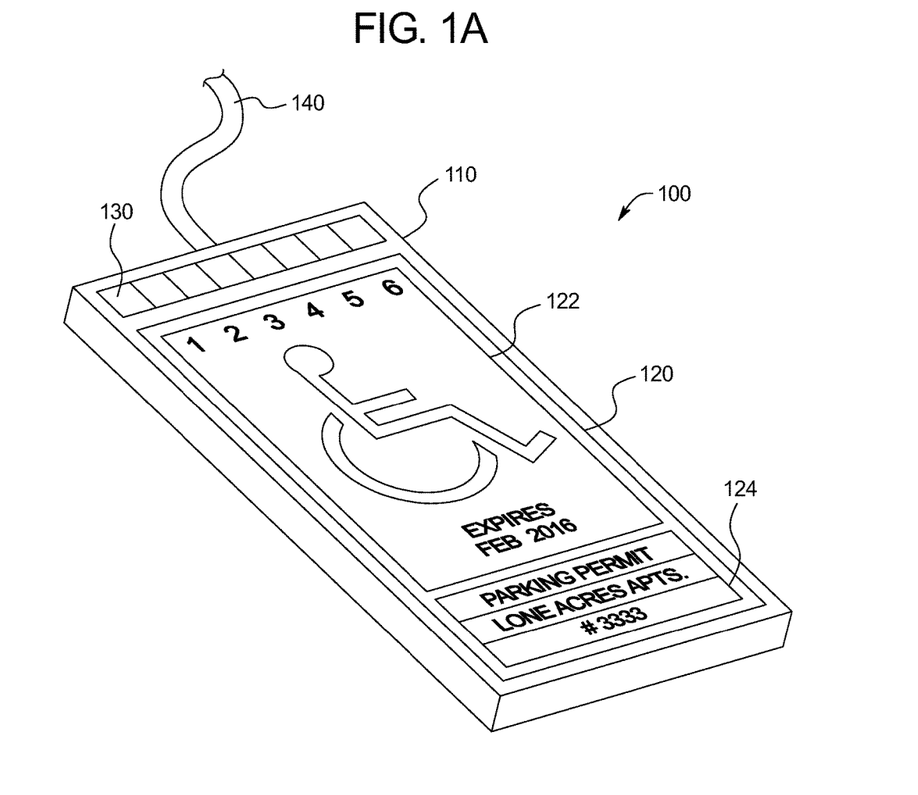
FIG. 1A is a perspective view of an example embodiment of the virtual tag display system of the present disclosure.
Figure 1B:
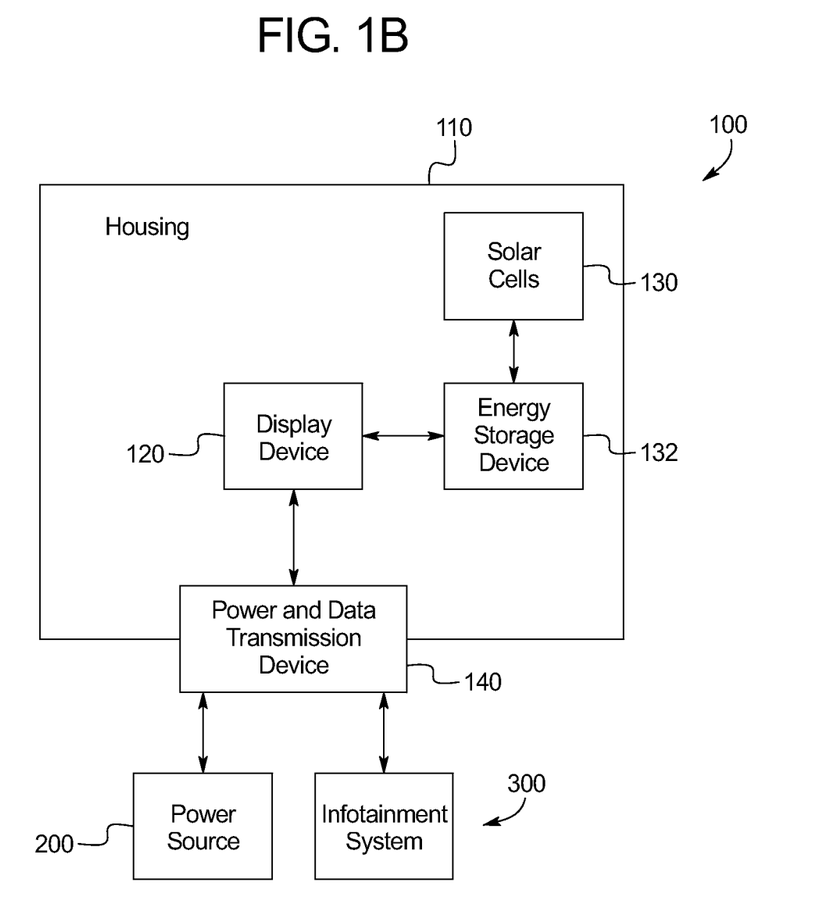
FIG. 1B is a block diagram of an example embodiment of the virtual tag display system of the present disclosure.

Various embodiments of the present disclosure provide a virtual tag display system. Generally, the virtual tag display system is configured to display one or more virtual tags stored in a memory of the vehicle such that the virtual tag(s) are viewable from outside the vehicle. FIGS. 1A and 1B illustrate one example embodiment of the virtual tag display system 100. The virtual tag display system 100 includes: (1) a housing 110, (2) a display device 120 supported by the housing 110, (3) a plurality of solar cells 130 supported by the housing 110, (4) an energy storage device 132 electrically connected to the display device 120 and the solar cells 130, and (5) a power and data transmission device electrically connected to the display device 120.

The housing 110 is rectangular, though the housing 110 may take any suitable shape. The housing 110 may be any suitable size and made of any suitable material, such as plastic, metal, or a composite material.

The display device 120 may be any suitable display device configured to display one or more virtual tags, such as but not limited to a liquid crystal display (LCD) or an organic light emitting diode (OLED). The display device 120 is rectangular, though the display device 120 may take any suitable shape. The display device 120 may be any suitable size.

The solar cells 130 (also called photovoltaic cells) convert light into electricity by the photovoltaic effect. In this embodiment, the virtual tag display system 100 includes eight solar cells 130, though the virtual tag display system 100 may include any suitable quantity of suitably-sized solar cells.

The energy storage device 132 receives electricity from the solar cells and stores the electricity for future use. The energy storage device 132 may be a suitable rechargeable battery.

The power and data transmission device or transmitter 140 is a cord or other suitable device configured to transmit electricity from a power source to the display device and data from a data source to the display device. More specifically, in this example embodiment, the power and data transmission device is configured to transmit electricity from a vehicle power source 200, such as the vehicle's battery, to the virtual tag display system 100 to power the display device 120. The power and data transmission device 140 is also configured to transmit data from an infotainment system 300 of the vehicle (described below) to the virtual tag display system 100. The data instructs the display device 120 what to display, which in this example embodiment is virtual tags 122 and 124 shown in FIG. 1A. In certain embodiments, the power and data transmission device comprises separate a power transmission device and data transmission device. In one such embodiment, the data transmission device is wireless.

In this embodiment, the vehicle power source 200 is the primary power source for the virtual tag display system 100. In certain situations, however, the energy storage device 132 is used to power the display device 120. For instance, in one example embodiment, when the vehicle is turned off the energy storage device 132 is used to power the display device 120 rather than the vehicle power source 200 (at least until the energy storage device 132 has too little power left to sufficiently power the display device 120). In another example embodiment, the energy storage device 132 is used to power the display device 120 rather than the vehicle power source 200 when a level of the vehicle power source 200 falls below a certain threshold. In another example embodiment, the energy storage device 132 is the primary power source for the virtual tag display system 100, and is used to power the display device 120 until its level falls below a certain threshold.

The virtual tag display system 100 includes one or more attachment mechanisms (not shown) that enable the virtual tag display system 100 to be attached to a window of the vehicle. The attachment mechanisms may include but are not limited to one or more suction cups, one or more adhesives (such as a polyurethane adhesive), and/or one or more hook-and-loop fasteners.

Figure 2A:
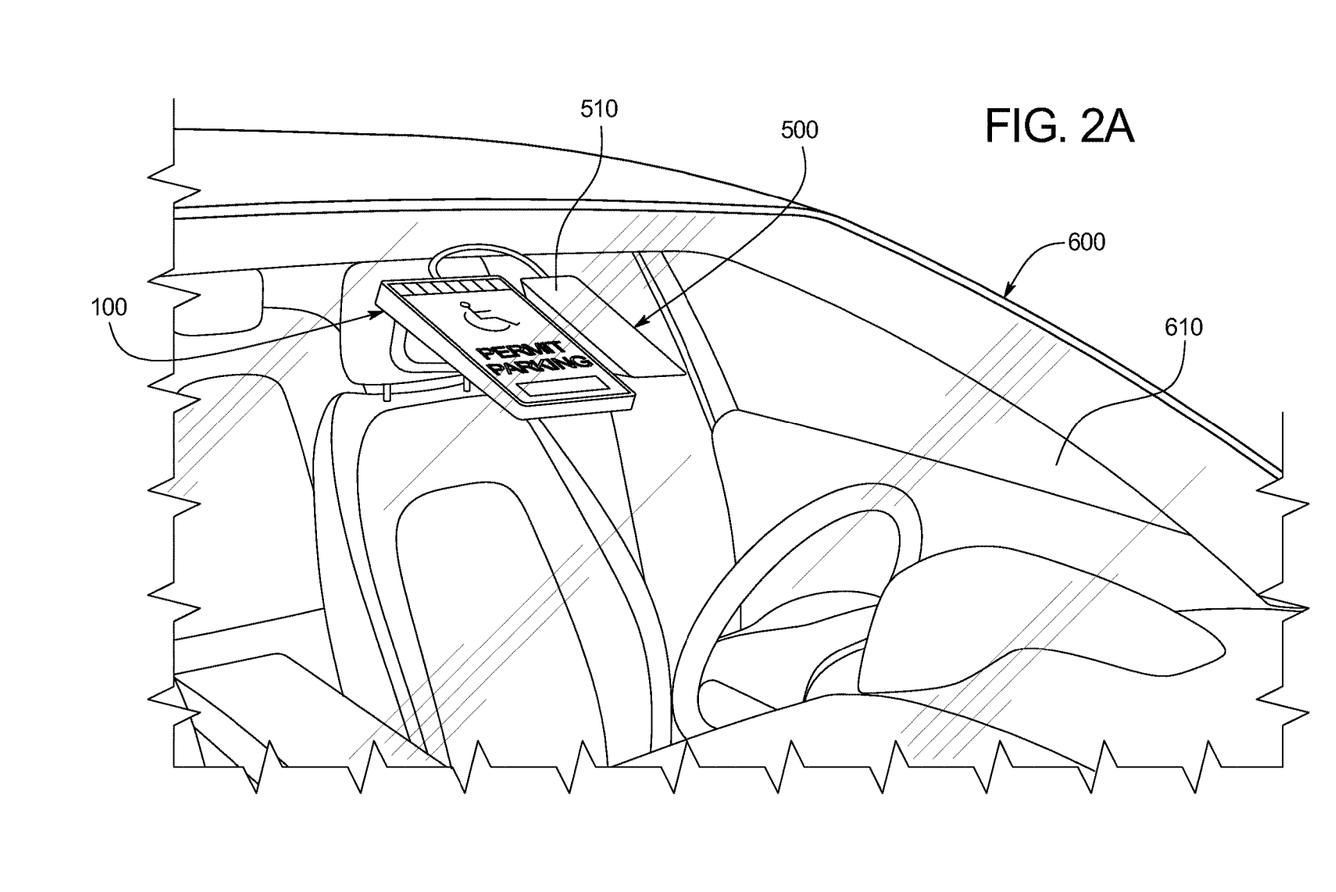
Figure 2B:
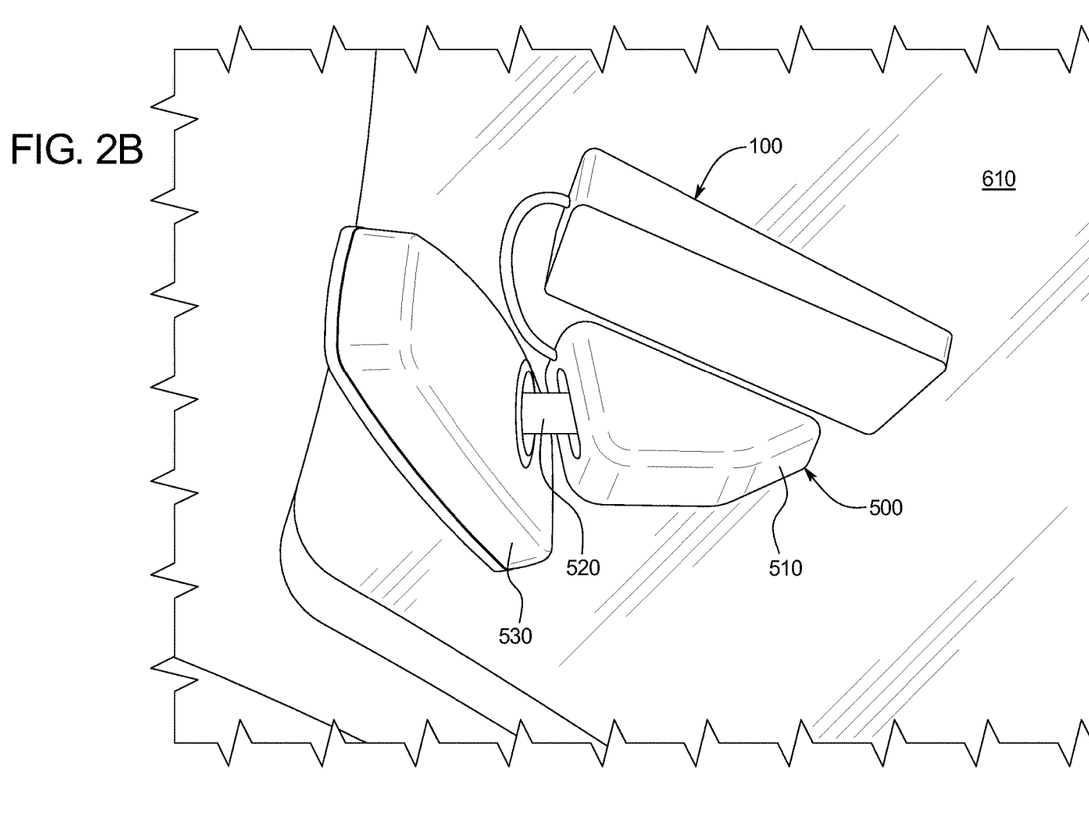
Figure 3A:
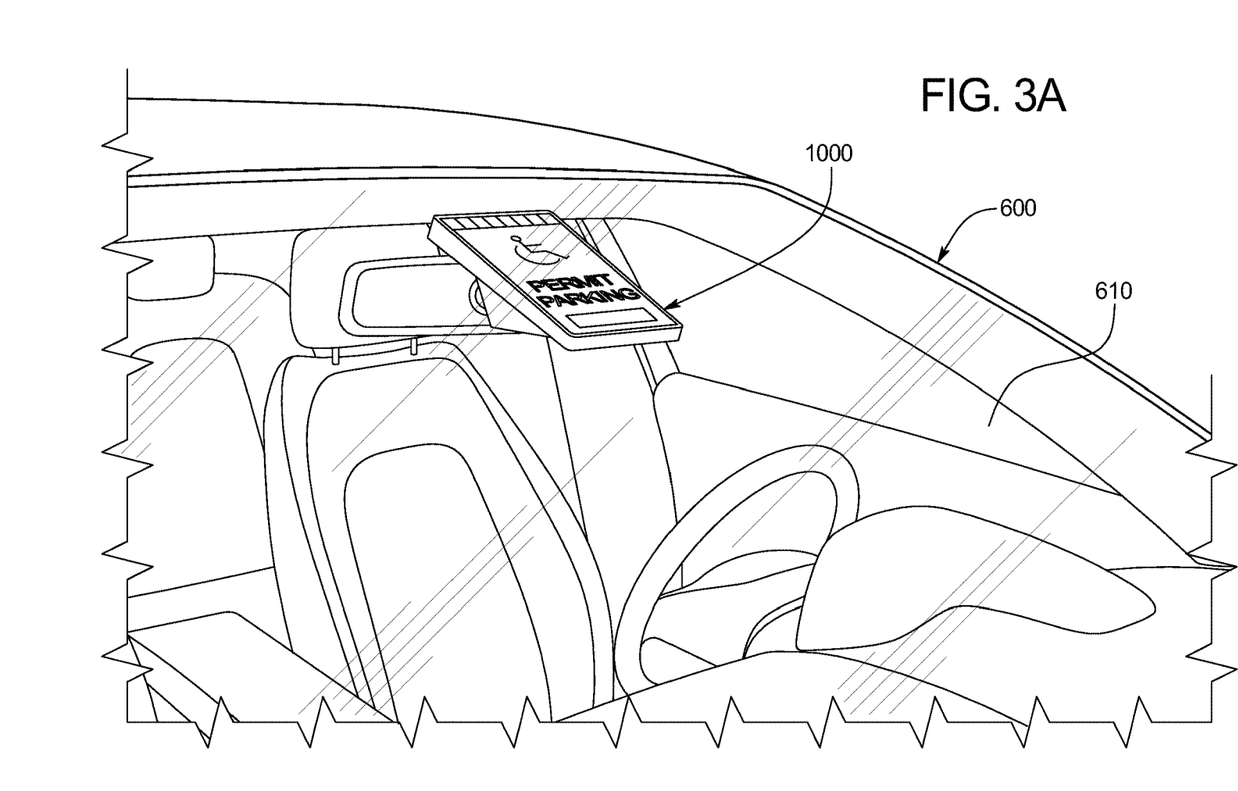
FIGS. 3A and 3B illustrate a mirror assembly integrated with the virtual tag display system and attached to a windshield of a vehicle.
Figure 3B:
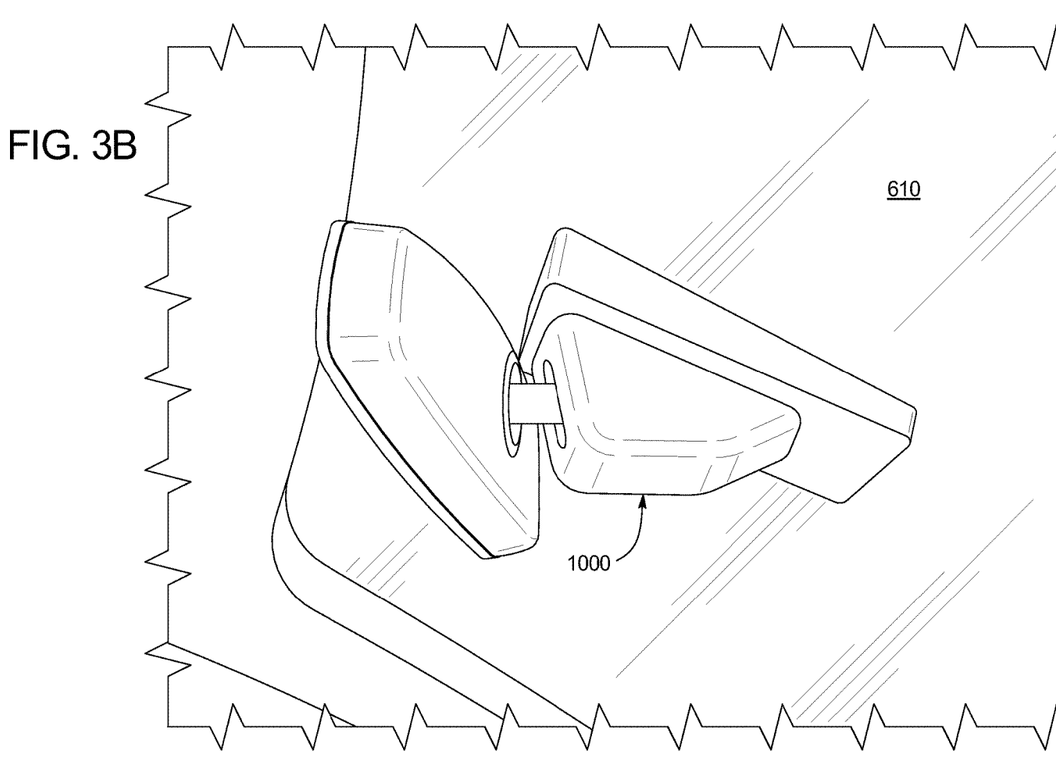

FIGS. 2A and 2B show the virtual tag display system 100 attached to a windshield 610 of a vehicle 600 adjacent the mounting base 510 of the interior rearview mirror assembly 500 of the vehicle 600. The virtual tag display system 100 is positioned such that the display device 120 is viewable from outside the vehicle (as best shown in FIG. 2A) and such that the user can manipulate the mirror 530 and corresponding arm 520 without interference from the virtual tag display system 100 (as best shown in FIG. 2B). FIGS. 3A and 3B show another embodiment of the virtual tag display system integrated into the mounting base of the rearview mirror assembly 1000.

In various embodiments, the virtual tag display system includes a transponder (such as a radio frequency identification unit (RFID)) within the housing. The transponder enables a toll payment to be automatically debited from a prepaid user account. Specifically, as the vehicle approaches a toll booth, a radio-frequency field emitted from an antenna activates the transponder. The transponder then sends a signal back to the antenna including an identifier. The antenna transfers the identifier to a server, which matches the identifier to the prepaid user account. The server then debits the proper toll amount from the prepaid user account.

2. Operation

As best shown in FIG. 1B, in operation, the virtual tag display system 100 interfaces with the vehicle's infotainment system 300 such that: (1) a user may upload one or more virtual tags to the vehicle's infotainment system 300; (2) the user may use the vehicle's infotainment system 300 to select which virtual tag(s) the user desires the virtual tag display system 100 to display; and (3) in response to the user's selection, the virtual tag display system 100 displays the selected virtual tag(s).

2.1 the Vehicle's Infotainment System

Figure 4:
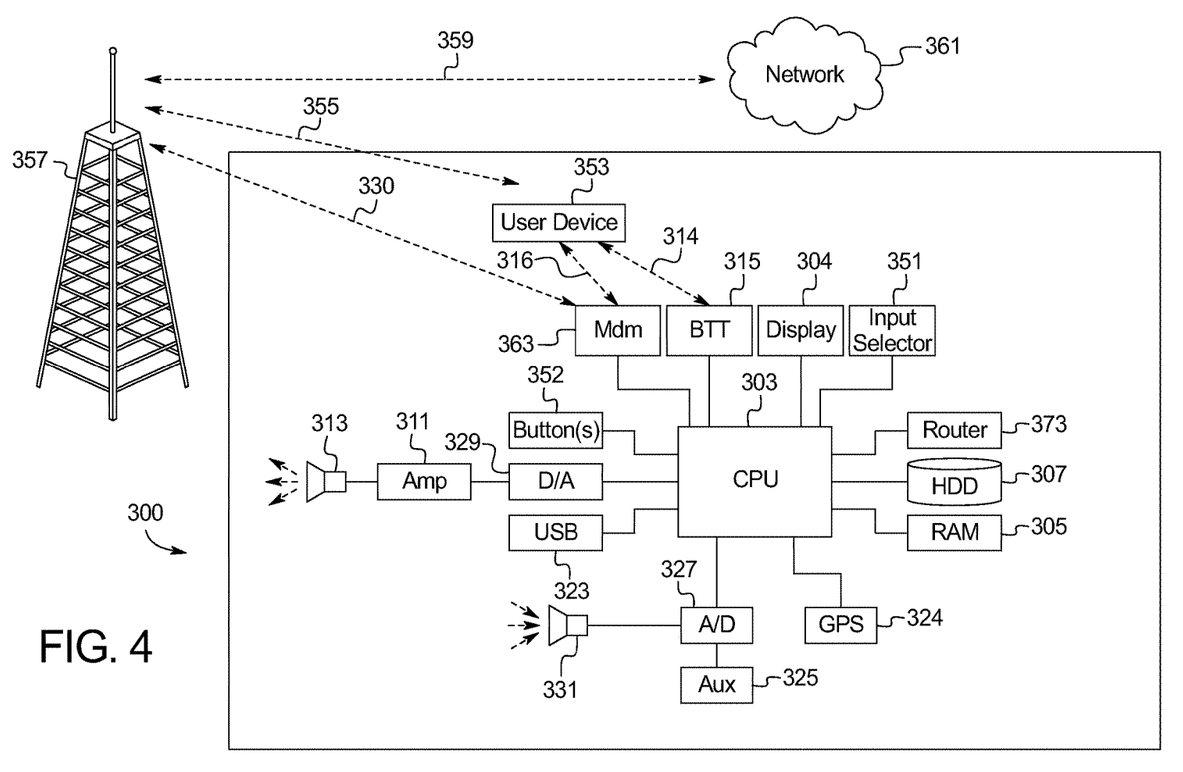
FIG. 4 is a block diagram of an example embodiment of a vehicle infotainment system.

FIG. 4 is a block diagram of the vehicle's infotainment system 300, which is a vehicle-based computing system. One example of an infotainment system is the SYNC® system manufactured by the FORD MOTOR COMPANY® (SYNC® and FORD MOTOR COMPANY® are registered trademarks of the Ford Motor Company). Other embodiments of the infotainment system may include different, fewer, or additional components than those described below and shown in FIG. 4.

In this example embodiment, the infotainment system 300 includes: (1) a processor 303; (2) a display 304; (3) a non-persistent memory device 305; (4) a persistent memory device 307; (5) an amplifier 311; (6) a speaker 313; (7) a BLUETOOTH® transceiver 315 (BLUETOOTH® is a registered trademark of Bluetooth SIG, Inc.); (8) a modem 363; (9) a USB port 323; (10) a GPS device 324; (11) an auxiliary input 325; (12) an analog-to-digital converter 327; (13) a digital-to-analog converter 329; (14) a microphone 331; (15) an input selector 351; (16) one or more buttons 352; and (17) a vehicle-based wireless router 373 having a WiFi transceiver (not shown). Although not shown, certain components of the infotainment system 300 may use a vehicle network (such as but not limited to a controller area network (CAN bus)) to pass data to and from one another and to other vehicle components.

The processor 303 at least partially controls operation of the different components of the infotainment system 300. The processor 303 enables processing of commands and routines onboard the vehicle. The processor 303 may be any suitable processing device or set of processing devices, such as but not limited to a microprocessor, a microcontroller-based platform, a suitable integrated circuit, or one or more application-specific integrated circuits (ASICs) connected to and configured to execute a set of instructions stored on one of the memory devices 305 and 307. The instructions may include software for operating the infotainment system 300.

In this example embodiment, the non-persistent memory device 305 is random access memory (RAM), which may include non-volatile RAM, magnetic RAM, ferroelectric RAM, and any other suitable forms. The persistent memory device 307 is a hard disk drive (HDD) or any other suitable memory, such as but not limited to flash memory, an EPROM, an EEPROM, a memristor-based non-volatile solid-state memory, unalterable memory, or read-only memory.

The infotainment system 300 includes a variety of different input devices that enable a user to provide an input to the infotainment system 300. Here, the input devices include the USB port 323, the auxiliary input 325, the microphone 331, and the buttons 352. Other input devices may include but are not limited to one or more control knobs, an instrument panel, a keyboard, a scanner, a digital camera for image capture and/or visual command recognition, a touch screen, a mouse, or a touchpad.

The USB port 323 is configured to receive a USB interface to enable communication between a remote device connected to the USB interface and the infotainment system 300. For instance, the USB port 323 can receive a USB interface of or connected to a portable hard drive (i.e., a computer-readable medium) to enable data stored on the portable hard drive to be uploaded to the persistent memory 307 of the infotainment system 300.

The auxiliary input 325 is configured to receive a wireless or wired input from an auxiliary device, such as a personal media player, a wireless health device, or a portable computing device. The auxiliary input 325 passes the input as an analog signal to the analog-to-digital converter 327. The analog-to-digital converter 327 converts the analog signal into a digital signal before passing the digital signal to the processor 303.

The microphone 331 is configured to receive sound (e.g., a user's speech), which it passes as an analog signal to the analog-to-digital converter 327. The analog-to-digital converter 327 converts the analog signal into a digital signal before passing the digital signal to the processor 303.

The buttons 352 may be any suitable buttons, such as but not limited to hard keys, soft keys, and virtual keys displayed on a display that are actuatable by a user to provide input to the infotainment system 300.

The input selector 351 is manipulatable to enable the user to choose how the user desires to provide an input to the infotainment system 300 by switching between various input options. For example, the user could manipulate the input selector 351 to activate the microphone 331 to enable the user to provide a speech command to the infotainment system 300 or to initiate pairing of the user device 353 and the infotainment system 300.

The infotainment system 300 includes a variety of different output devices configured to output information observable by the user. Here, the output devices include the display 304 and the speaker 313, though the infotainment system 300 may include any other suitable output devices. The display 304 may be any suitable display device, such as but not limited to an LCD, an OLED, a flat panel display, a solid state display, a cathode ray tube (CRT), or a heads-up display. The speaker 313 may be any suitable speaker or other stereo system component configured to output audio. Specifically, the processor 303 passes a digital signal to the digital-to-analog converter 309. The digital-to-analog converter 309 converts the digital signal to an analog signal, which it passes to the speaker 313. The speaker 313 outputs the analog signal as audio.

The infotainment system 300 includes a variety of different communication interfaces, each of which includes a wired and/or a wireless interface to enable communication between the infotainment system 300 and one or more remote devices, such as but not limited to a user device 353 (e.g., a cell phone, a smart phone, a personal digital assistant, or a laptop computer); a cellular tower 357; or a WiFi access point (not shown). Here, the communication interfaces include the BLUETOOTH® transceiver 315, the modem 363, the GPS device 324, and the router 373, though the infotainment system 300 may include any other suitable communication interfaces.

The BLUETOOTH® transceiver 315 enables the infotainment system 300 to pair with the user device 353 so the user device 353 and the infotainment system 300 can communicate with each other. Specifically, the BLUETOOTH® transceiver 315 can pair with a BLUETOOTH® transceiver (not shown) of the user device 353 (as is known in the art). Once paired, the infotainment system 300 and the user device 353 can communicate with one another, represented by signal 314. In certain embodiments, the BLUETOOTH® transceiver 315 initiates the pairing, such as following receipt of an input from the user or automatically after recognizing the BLUETOOTH® transceiver of the user device 353 is within a suitable range. In other embodiments, the BLUETOOTH® transceiver of the user device 353 initiates the pairing, such as following receipt of an input from the user or automatically after recognizing the BLUETOOTH® transceiver 315 of the infotainment system 300 is within a suitable range.

Once the infotainment system 300 and the user device 353 are paired, the infotainment system 300 can communicate through the user device 353 with an external network 361. For example, the user device 353 can communicate with the external network 361 via the cellular tower 357 (or a WiFi access point), represented by signals 355 and 359. When the user device 353 is paired with the infotainment system 300, the infotainment system 300 can communicate with the external network 361 via its ability to communicate with the user device 353, as represented by signal 316. Once paired, the infotainment system 300 and the external network 361 may communicate in any suitable manner, such as but not limited to by using a data plan, data over voice, or dual tone multi frequency tones.

In certain embodiments, the processor 303 runs an operating system including an application program interface (API) to communicate with application software. The application software may access an embedded module or firmware on the BLUETOOTH® transceiver 315 to enable wireless communication between the BLUETOOTH® transceiver 315 and the BLUETOOTH® transceiver of the user device 353. BLUETOOTH® is a subset of the IEEE 802 personal area network (PAN) protocols. IEEE 802 local area network (LAN) protocols include WiFi and have considerable cross-functionality with IEEE 802 PAN. Both are suitable for wireless communication within a vehicle. Other communication methods that can be used are free-space optical communication (such as infrared data association) and non-standardized consumer infrared protocols.

The external network 361 may be a collection of one or more networks, including standards-based networks (e.g., 2G, 3G, 4G, Universal Mobile Telecommunications System (UMTS), Global System for Mobile Communications (GSM), Long Term Evolution (LTE), and the like); WiMAX; BLUETOOTH®; near field communication (NFC); WiFi (including 802.11 a/b/g/n/ac or others); WiGig; Global Positioning System (GPS) networks; and the like. Further, the external network 361 may be a public network, such as the Internet; a private network, such as an intranet; or combinations thereof, and may utilize a variety of networking protocols now available or later developed including, but not limited to, TCP/IP-based networking protocols.

The modem 363 enables the infotainment system 300 to communicate with the external network 361. In various embodiments, the modem 363 enables the infotainment system 300 to communicate with the external network 361 via the user device 353. For example, the user device 353 can communicate with the external network 361 via the cellular tower 357 (or a WiFi access point), represented by signals 355 and 359. When the user device 353 is connected to the modem 363, the infotainment system 300 can communicate with the external network 361 via its ability to communicate with the user device 353 over the voice band, as represented by signal 316. In other embodiments, the modem 363 enables the infotainment system 300 to communicate with the external network 361 by bypassing the user device 353 and directly communicating with the cellular tower 357 (or a WiFi access point), represented by signals 320 and 359.

In other embodiments, the user device 353 includes a modem for voice band or broadband data communication. In the data-over-voice embodiment, a technique known as frequency division multiplexing may be implemented when the user of the user device 353 can talk over the user device 353 while data is being transferred. At other times, when the user is not using the user device 353, the data transfer can use the whole bandwidth (300 Hz to 3.4 kHz in one example). While frequency division multiplexing may be common for analog cellular communication between the vehicle and the Internet, and is still used, it has been largely replaced by hybrids of with Code Domian Multiple Access (CDMA), Time Domain Multiple Access (TDMA), or Space-Domian Multiple Access (SDMA) for digital cellular communication. These are all ITU IMT-2000 (3G) compliant standards, and offer data rates up to 2 Mbit/s for stationary or walking users and 385 kbit/s for users in a moving vehicle. 3G standards are now being replaced by IMT-Advanced (4G) which offers 100 Mbit/s for users in a vehicle and 1 Gbit/s for stationary users. If the user has a data-plan associated with the user device 353, the data-plan may allow for broadband transmission and the infotainment system 300 could use a much wider bandwidth (speeding up data transfer). In still another embodiment, the user device 353 is replaced with a cellular communication device (not shown) that is installed in the vehicle itself.

The GPS device 324 may include a GPS receiver and a GPS antenna (not shown) configured to communicate with one or more satellites to enable determination of the vehicle's location.

The vehicle-based wireless router 373 and WiFi transceiver enable the infotainment system to directly connect to a WiFi network (not shown).

In addition to having exemplary processes executed by the infotainment system, in certain embodiments, the exemplary processes may be executed by a computing system in communication with the infotainment system. This computing system may include, but is not limited to, a wireless device (e.g., a mobile phone) or a remote computing system (e.g., a server) connected through the wireless device. Collectively, such systems may be referred to as vehicle associated computing systems (VACS). In certain embodiments, particular components of the VACS may perform particular portions of a process depending on the particular implementation of the system. For example, if a process has a step of sending or receiving information with a paired wireless device, then it is likely that the wireless device is not performing the process, since the wireless device would not "send and receive" information with itself. One of ordinary skill in the art will understand when it is inappropriate to apply a particular VACS to a given solution. In all solutions, it is contemplated that at least the infotainment system located within the vehicle itself is capable of performing the exemplary processes.

2.2 Uploading Virtual Tag(s) to the Vehicle's Infotainment System

The virtual tag display system 100 interfaces with the vehicle's infotainment system 300 to enable a user to upload one or more virtual tags to the vehicle's infotainment system 300 and, specifically, to the persistent memory device 307 of the vehicle's infotainment system 300.

In certain embodiments, the infotainment system 300 enables a user to upload one or more virtual tags to the infotainment system 300 via a USB storage device. More specifically, a user may load one or more virtual tags onto a USB storage device and plug the USB interface of the USB storage device into the USB port 323 of the infotainment system 300.

In one embodiment, after the USB port 323 receives the USB interface of the USB storage device, the infotainment system 300 automatically downloads any virtual tags stored on the USB storage device to the persistent memory device 307. The infotainment system 300 may do so without downloading any virtual tags that are duplicates of any virtual tags already stored in the persistent memory device 307.

In another embodiment, after the USB port 323 receives the USB interface of the USB storage device, the infotainment system 300 enables the user to manually choose which particular virtual tags stored on the USB storage device the user desires to upload to the infotainment system 300. For instance, the infotainment system may display, on the display 304, a list or an array of selectable icons indicating the virtual tags stored on the USB storage device, and enable the user to select, using the touch screen or the buttons 352, which particular virtual tags stored on the USB storage device the user desires to upload to the infotainment system 300.

In certain embodiments, the infotainment system 300 enables a user to upload one or more virtual tags to the infotainment system 300 via a wireless communication, such as via the BLUETOOTH® transceiver 315, the modem 363, or the router 373 as generally described above. For instance, a user's user device may store a plurality of virtual tags the user desires to upload to the infotainment system 300. In this example embodiment, the user may pair the user device 353 with the infotainment system 300 via the BLU- ETOOTH® transceiver 315 and then upload the virtual tags from the user device 353 to the infotainment system 300.

In certain embodiments, the infotainment system 300 is configured to access (in any of the manners described above) a user account of the user stored on remote server. In these embodiments, the user may upload one or more virtual tags to the user's user account using a suitable device, such as a desktop computer, laptop computer, tablet computing device, smartphone, and the like. In one embodiment, the vehicle's infotainment system 300 is configured to periodically access the remote server and the user account and download from the remote server and to the persistent memory device 307 any newly-uploaded virtual tags. In another embodiment, once a user uploads one or more virtual tags to the user's user account, the remote server pushes the newly-uploaded virtual tag(s) to the infotainment system 300, which downloads and stores the virtual tag(s) in the persistent memory 307.

In other embodiments, the infotainment system is configured to receive a virtual tag directly from a tag issuing authority, such as by retrieving the virtual tag from a server hosted by the tag issuing authority or by receiving data from a server hosted by the tag issuing authority. For instance, in one example embodiment a state's Secretary of State Office controls distribution of handicapped parking permits. In this example embodiment, if a user applies for and is granted a handicapped parking permit, the Secretary of State Office sends a virtual tag corresponding to the handicapped parking permit to the user's vehicle.

2.3 Enabling Selection of One or More Virtual Tags to Display and Displaying the Selected Virtual Tag(s)

Once one or more virtual tags have been upload to and stored in the vehicle's infotainment system 300, the user may use the vehicle's infotainment system 300 to select which virtual tag(s) the user desires the virtual tag display system 100 to display. The vehicle's infotainment system 300 then instructs, via the power and data transmission device 140, the virtual tag display system 100 to display the selected virtual tag(s) via the display device 120.

Figure 5:
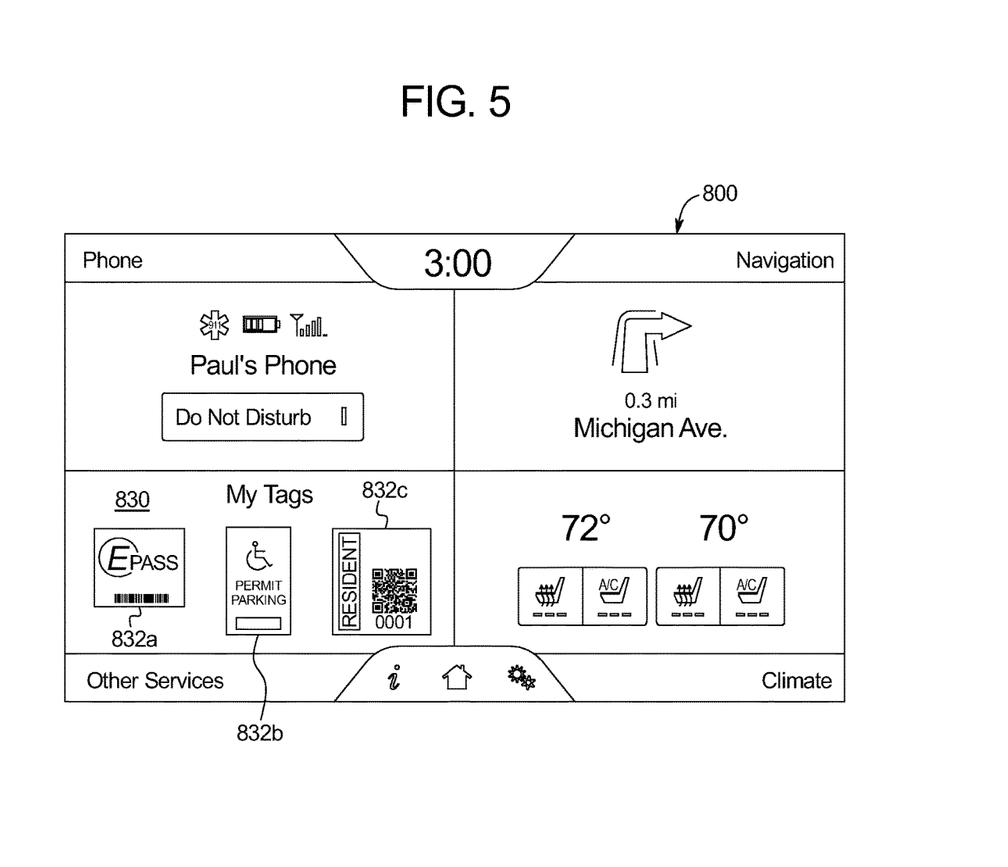
FIG. 5 is a screenshot of a display device of the vehicle infotainment system of FIG. 4.

FIG. 5 illustrates a screenshot of a display device 800 of the vehicle's infotainment system 300. In this illustrated embodiment, the display device 800 displays a "My Tags" window 830 that displays three virtual tags 832a, 832b, and 832c that the user have been uploaded to the infotainment system 300. The user can select which of these virtual tags 832a, 832b, and 832c the user desires the display device 120 to display.

In certain embodiments, the user may use the user device 353 to select which virtual tag(s) the user desires the virtual tag display system 100 to display. For instance, the user may download and install an application on the user device 353 that enables the user to choose which virtual tag(s) the user desires the virtual tag display system 100 to display and that transmits that information to the infotainment system 300 in any of the manners described above (e.g., via a BLUETOOTH® connection).

In other embodiments, the infotainment system 300 automatically determines which virtual tag(s) to display based on the vehicle's location (e.g., as determined by the GPS device 324 or in any other suitable manner). For instance, a user may associate a particular virtual tag, such as an employee parking permit, with a particular location, such as an employee parking lot. In this example embodiment, when the infotainment system 300 determines that the vehicle is located in the employee parking lot, the infotainment system 300 automatically instructs the display device 120 of the virtual tag display system 100 to display the employee parking permit.

In further embodiments, the infotainment system 300 (or any other suitable system or element of the vehicle) is configured to detect a signal emitted by a scanner, antenna, or other external device. After detecting the signal, the infotainment system 300 selects a virtual tag based on the detected signal and displays the virtual tag on the display device 120 of the virtual tag display system 100. For instance, an employee parking lot may have an antenna that broadcasts an identifying signal. When the vehicle enters the employee parking lot and the infotainment system detects this signal, the infotainment system automatically selects the employee parking permit virtual tag and displays that employee parking permit on the display device.

A virtual tag may be any suitable representation of or replacement for a corresponding physical tag. For instance, a virtual tag may include a photograph of the corresponding physical tag. In another example, a virtual tag may include a digital representation of the corresponding physical tag. In another example, a virtual tag may include text. In another example, a virtual tag may include a logo or other illustration. In another example, a virtual tag may include a scannable barcode or QR code.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle tag display system comprising:
a display integrated with a vehicle showing a virtual tag received from a vehicle computer;
an auxiliary battery powering the display when the vehicle is off;
a vehicle battery powering the display when the vehicle is off and the auxiliary battery level falls below a threshold; and
a port to:
recharge the auxiliary battery via the vehicle battery when the vehicle is on; and
transfer data with the computer.

2. The vehicle tag display system of claim 1, comprising a solar cell wired to the auxiliary battery, wherein the display, the battery, and the solar cell are supported by a housing.

3. The vehicle tag display system of claim 2, wherein the solar cells are solar cell is electrically connected to the display device to power the display device.

4. The vehicle tag display system of claim 2, wherein the battery is configured to store energy received from the solar cell.

5. The vehicle tag display system of claim 4, wherein the battery primarily powers the display when the vehicle is off and in shade.

6. The vehicle tag display system of claim 1, which includes a housing and one or more attachment mechanisms enabling attachment of the housing to a windshield of the vehicle.

7. A mirror assembly comprising:
a base including a display device integrated with a vehicle configured to display a virtual tag in response to data received from a vehicle computing system of the vehicle;
an auxiliary battery supported by the base and wired to the display to power the display when the vehicle is off, wherein a vehicle power source powers the display when the vehicle is off and an auxiliary battery level is less than a threshold;
a solar cell supported by the base and wired to the battery;
a power transmission device electrically connectable to the vehicle power source to power the display device and recharge the auxiliary battery when the vehicle is on;
a data transmission device electrically connectable to the vehicle computing system to enable data transfer from the vehicle computing system to the display device; and
a mirror connected to the base.

8. The mirror assembly of claim 7, further including an arm connecting the mirror to the base.

9. The mirror assembly of claim 7, wherein the power transmission device and the data transmission device are included in a universal serial bus (USB) port supported by the base.

10. The mirror assembly of claim 9, wherein the solar cell is electrically connected to the display device to power the display device.

11. The mirror assembly of claim 9, wherein the battery is configured to store energy received from the solar cell.

12. The mirror assembly of claim 11, wherein the battery primarily powers the display when the vehicle is off and in shade.

13. The mirror assembly of claim 7, which includes one or more attachment mechanisms enabling attachment of the base to a windshield of the vehicle.

14. A vehicle comprising:
a vehicle computing system;
a display device integrated with the vehicle separate from and electrically connected to the vehicle computing system to enable data transfer from the vehicle computing system to the display device, the display device configured to display a virtual tag in response to data received from the vehicle computing system;
an auxiliary battery wired to the display device to power the display when the vehicle is off;
a solar cell wired to the auxiliary battery to power the display device and recharge the auxiliary battery; and
a vehicle power source electrically connected to the display device to power the display device and recharge the auxiliary battery when the vehicle is on, wherein the vehicle power source powers the display when the vehicle is off and a level of the auxiliary battery is below a threshold.

15. The vehicle of claim 14, further including a windshield and a mirror assembly, the mirror assembly including the display device, the mirror assembly attached to the windshield such that the display device faces the windshield.

16. The vehicle of claim 14, further including a windshield and a vehicle tag display system including the display device, the vehicle tag display system attached to the windshield.

17. The vehicle of claim 16, further including a mirror assembly, the mirror assembly attached to the windshield such that the mirror assembly is spaced apart from the vehicle tag display system.

18. The vehicle of claim 17, wherein the vehicle tag display system further includes a housing that supports the display device, the battery, the solar cell, a power transmission device electrically connecting the display device to the vehicle power source, and a data transmission device electrically connecting the display device to the vehicle computing system.

* * * * *